Oct. 25, 1932.    J. K. WOOD    1,884,477
VIBRATION DAMPENER
Filed Feb. 18, 1929    2 Sheets-Sheet 1
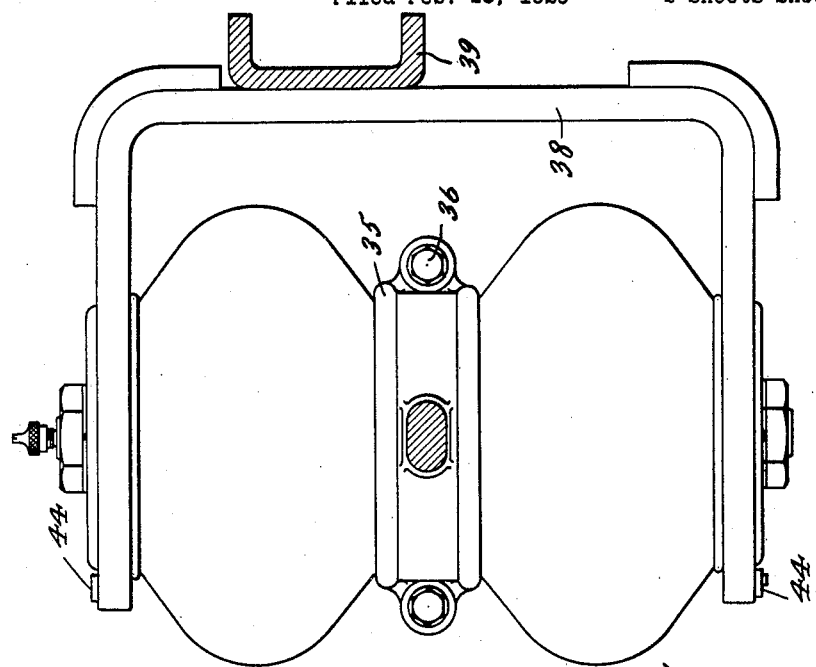
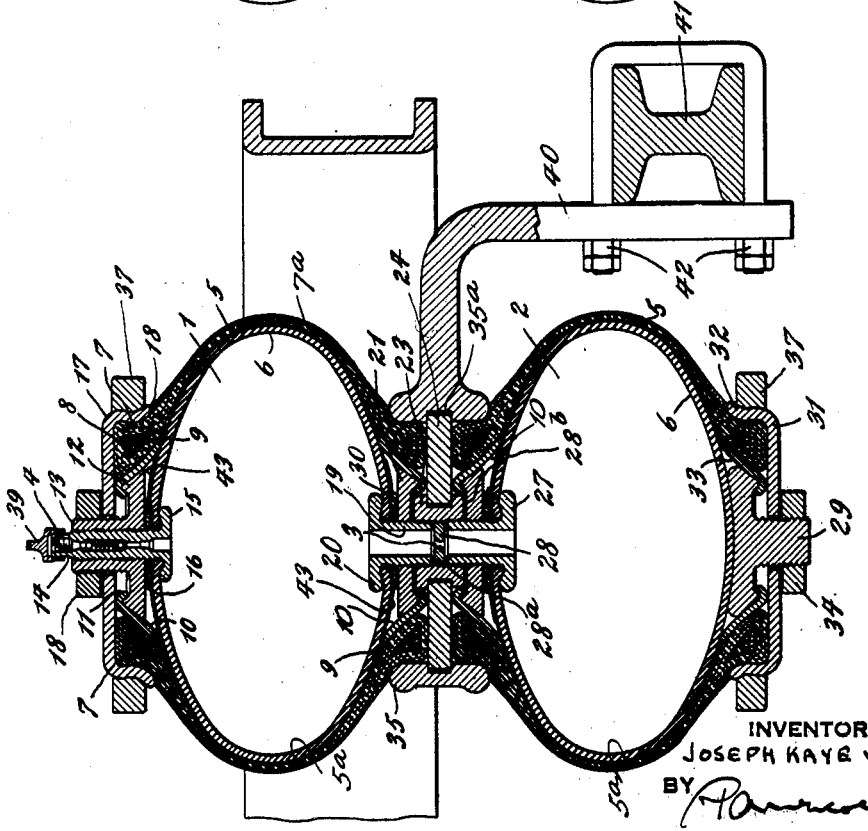
INVENTOR:
JOSEPH KAYE WOOD
BY
ATTORNEY Oct. 25, 1932. J. K. WOOD 1,884,477
VIBRATION DAMPENER
Filed Feb. 18, 1929 2 Sheets-Sheet 2
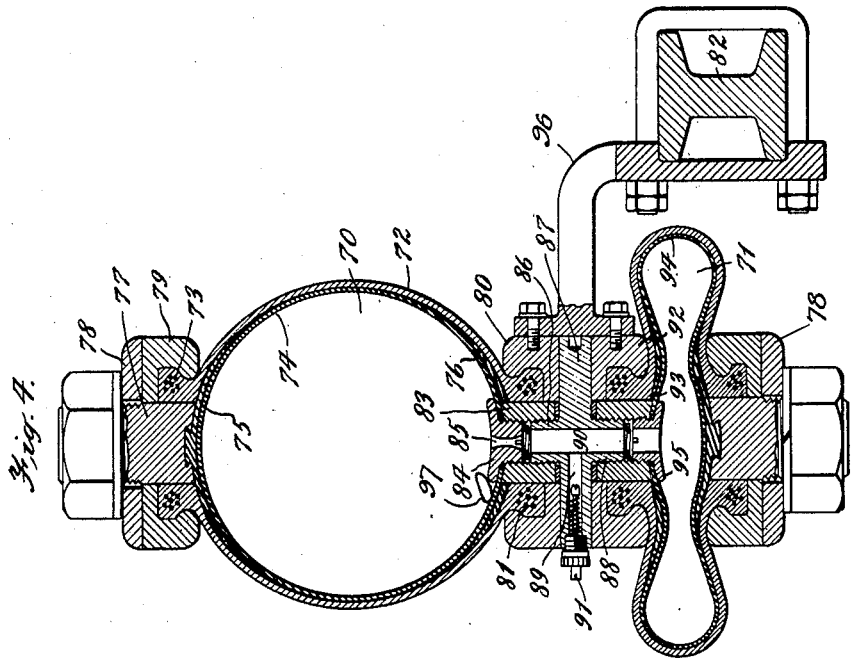
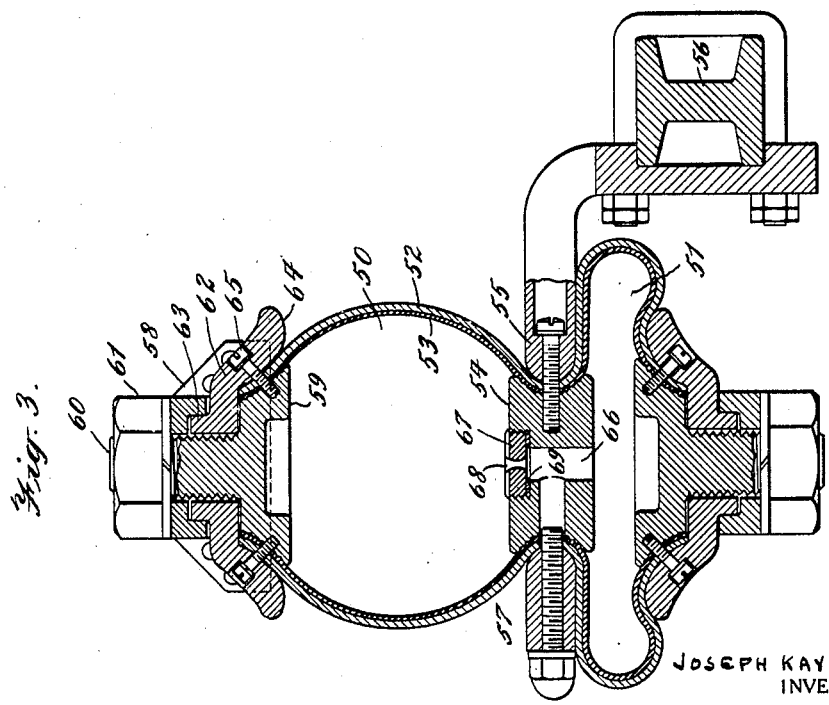
Joseph Kaye Wood,
INVENTOR
BY
ATTORNEY Patented Oct. 25, 1932

1,884,477

UNITED STATES PATENT OFFICE

JOSEPH KAYE WOOD, OF MOUNT VERNON, NEW YORK, ASSIGNOR TO WALTER P. ALBERT, OF MADISON, NEW JERSEY

VIBRATION DAMPENER

Application filed February 18, 1929. Serial No. 340,767.

This invention relates to vibration dampeners or controllers and more particularly to such devices as shock absorbers employing a fluid as the elastic element.

The invention is in the nature of an improvement on the device disclosed in United States Patent No. 1,649,643, wherein a plurality of interconnected bellows-like chambers containing air under pressure are adapted alternately to expand and contract. When the device is employed either as a shock absorber or snubber for a vehicle the compression of a chamber serves to store up energy, which is gradually expended during the peak of the movement, serving to check the rebound. Because of the nature of the communication passage or orifice between the chambers and the resilient walls thereof, the "snubbing" or dampening action is equally effective independently of the initial rate of expansion of the chambers. Accordingly it is one of the objects of the invention to provide a shock absorber of the above noted type, which is of rugged construction, easy to assemble and efficient in operation.

A feature of the invention relates to a shock absorber or vibration dampening or controlling mechanism, employing as the enclosing chamber for the fluid a plurality of specially shaped resilient wall members.

Another feature pertains to the novel manner of fastening the resilient members to the frame or axle of a vehicle or the like, whereby each unit may be easily assembled or taken apart for replacement or repair.

A further feature pertains to the manner of constructing the walls of the resilient chambers so that during compression they can flex without being subjected to undue strain or chafing. In accordance with the present preferred embodiment flexing occurs gradually from the point of attachment where it is minimum to the point of maximum bag diameter where the flexing is a maximum.

A further feature pertains to a flexible wall member for a shock absorber unit, which is formed like a tire carcass and from tire material having reinforcing beading adjacent the points where the unit is attached to the frame or axle of a vehicle or the like.

A still further feature relates to the use of a cartridge of hygroscopic material for preventing the clogging with ice formed from the moisture content of the contained air during the winter season, of the communication duct between cooperating chambers according to the invention.

Further features and advantages not specifically enumerated will be apparent after a consideration of the following detailed description and the appended claims.

Referring to the drawings, Fig. 1 shows a view in section of a preferred form of shock absorber unit according to the invention, and illustrates the novel manner of uniting and fastening the individual chambers to the frame and axle of a vehicle or the like.

Fig. 2 is a side view of the device shown in Fig. 1, and illustrates more clearly the manner of attaching the device to the framework.

Fig. 3 shows an alternative manner of forming the shock absorber units from a single length of tire material made in accordance with usual tire construction. This figure also shows a modified manner of attaching the unit to a vehicle frame.

Fig. 4 is another modification of Fig. 1 and shows the feature of providing rubber inserts for protecting the inner tube of the device. This figure also shows a different manner of securing the shock absorber to the frame as well as a different disposition of the valve.

Referring more particularly to Fig. 1, the preferred embodiment consists generally of two superposed bellows-like chambers 1 and 2 which communicate with each other through a relatively small aperture or orifice 3. A valve 4 communicates with the upper chamber 1 and provides a means for inflating both the chambers. While the walls of members 1 and 2 may be constructed of any suitable flexible material, it is preferred to employ a structure similar to that used in vehicle tires comprising an outer casing 5 of tire carcass material which may be of standard rubber-impregnated cord or fabric construction and an inner container or tube 6 of rubber, which acts similarly to a tire inner tube. Fig. 1 of the drawings shows each of the chambers in its normal shape, which may be that of an oblate-spheroid. It will be noted, however, that the casing 5 of each chamber tapers away from the spherical central portion, as indicated by the numeral 7ª to form a kind of reversely curved circular lip 7. These lip portions are preferably thickened, as shown, and are reenforced by wire beads 8 embedded therein. The inside of casing 5 has a rubber coating 5ª which is gradually thickened toward the lips forming ends of the casing so as to form a shoulder 9. A split metal ring 10 is positioned within each end of the casing. This ring has flaring sides forming a large end which is directed toward the inside of the casing and abuts against the shoulder 9, forming a smooth point therewith upon which the inner tube 6 may rest without damage. The smaller end of the ring has a turned-in edge 11 which engages a corresponding raised rim 12 on an internally and externally threaded member 13. Passing through the center of member 13 is a threaded valve stem 14 which has a flanged end 15 serving to clamp the edge of the wall of inner tube 6 to the member 12 in accordance with standard tire inner tube construction. The edges of the flange 15 are preferably rounded and slightly recessed and a washer 16 is provided between the members 12 and 15. For the purpose of reenforcing the inner tubes at the points where they are clamped to members 15, 19 and 27, the outer surface of the tube may be provided with graduated layers or reenforcements represented by the numeral 43.

A cover 17 has a central opening enabling it to be fitted over the member 13. The cover has a flanged rim which is slightly flared, as shown in Fig. 1, and the edge of said rim is preferably rounded. For the purpose of clamping the assembled unit in position a nut 18 is provided. As this nut is tightened it draws member 13 together with the valve stem upwardly. During this movement the upturned edge of member 12 engages the ring 10 at 11 to wedge the beaded portion 7 against the rim of member 17.

A substantially similar clamping arrangement is provided for the opposite end of each chamber. The lower opening of the chamber 1 receives a hollow externally threaded member 19 which has a flange 20 corresponding to the flange 15 of the valve stem 13. Similarly a flanged ring 21 is threaded on the member 19 and serves to clamp the edge of the inner tube 6 against the flange 20. For the purpose of properly spacing and uniting chamber 1 to chamber 2 an internally threaded sleeve 23 is provided. Sleeve 23 has its outer circumference recessed to receive the circular band 24 which is formed in two halves. Threaded within the opposite internal end of the sleeve 23 is a hollow screw threaded member 27 which has a clamping flange similar to flange 19. Positioned between the opposing ends of the members 19 and 27 is a circular member 28 having a small aperture or orifice 3 therein acting as a throttle valve between the two chambers. Gaskets 28ª are provided between the member 28 and the members 19 and 27, as shown. These gaskets may be of any suitable type capable of providing and maintaining an air-tight connection between the walls of members 19 and 27. One form that has been found very efficient for this purpose is an impregnated fabric washer coated with a layer of Mogul varnish or the like. Similar gaskets 28ᵇ are provided between the sleeve 23 and the rings 21.

The chamber 2 is continuous except for the opening through which the member 27 passes. The clamping means for the lower end of this chamber is substantially similar to that already described in connection with the upper end of the chamber 1, and comprises a cover 31 having a flared rim 32 and a split ring 33 within the casing 5. A nut 34 is provided for clamping the end of the casing between the rim 32 and ring 33 as hereinabove described. The member 29 which corresponds to the member 13 is imperforate and its inner end is concave to correspond to the curvature of the inner tube 6. While members 15 and 19 may be removably attached to the chamber walls it is preferred to secure these members thereto in the manner of standard tire construction practiced.

The device is assembled in the following manner. Starting with the inner tube 6 having stem members 19 and 27 secured thereto by rings 21, a gasket 28ᵇ is put on the stem 19 and sleeve 23 screwed into place. The orifice plate 28 is next screwed into the sleeve 23 with the gaskets 28ª properly positioned so that it abuts against the end of the member 19. The stem 27 is screwed into the sleeve with its gasket 28ᵇ properly in place so as to make a tight joint.

The two inner tubes are now properly interconnected and the next step is to put on the casings 5. Each inner tube 6 is pulled into position in its casing 5 far enough to permit the split ring 10 adjacent to the sleeve 23, to be put into place within the casing. After this ring has been positioned the corresponding ring at the opposite end of the casing is inserted, the cover plate 17 put into position and retained by nut 18 which is drawn up firmly on the threaded member 13. The corresponding steps are carried out with the other chamber and then the split ring 24 is slid into position between the opposed ends of the casings 5, around the grooved sleeve 23. The supporting bracket 40 is next clamped around the ring 24, the cap being drawn up against the end of the casing 5 by means of the bolts 36. When the cap is drawn into place the ends of the casings are wedged tightly against the rings 10 and 24 as the channel 35ᵃ is slightly greater in diameter than the ring 24.

The final step is to connect the supporting yoke 38. This is done by forcing the rim of each cover plate into the corresponding opening or split ring in the ends of the yoke. The rims of the cover plates and the inside of the openings are curved so as to have portions of different radii in order that as the latches 44 fasten and the openings in the yoke thereby contract, the cover plates are tightly gripped and prevented from movement with respect to the yoke.

Assuming the members 13, 14 and 29 to be already clamped to the inner tubes the split rings 10 are placed inside the ends of the casings in the manner mentioned hereinbefore and the cover plates 17 and 31 put in place and retained by nuts 18 and 34. As the nuts are drawn up against the plates the beads 17 of the casings are wedged tightly between the rings 10 and the rims of the cover plates.

The assembled device may be installed in a vehicle by attaching the yoke 38 to the frame and bracket 40 to the axle of the vehicle. Air is forced into the chambers to the desired pressure through valve 4 and the valve covered by a suitable cap 39 in the usual well known manner.

By means of the above described arrangement for clamping the units to the frame and axle respectively each chamber when compressed, is not subjected to any excessive strain since the downward pressure instead of producing a compression strain on the chamber walls merely flexes the same around the curved ends of the rims 18' and ring 35. The walls are substantially free to expand laterally without any sharp bends in the peripheral surface.

Referring to Fig. 3, there is shown another embodiment of the invention in which the unit comprises upper and lower chambers 50 and 51 formed preferably from a single length of tire material comprising an outer layer of tire fabric 52 and an inner tube 53. Midway between the ends of the unit and on the interior thereof is a solid circular member 54 having its outer face recessed to provide a clamping surface for the material. Cooperating with the member 54 is a two part clamping ring having one-half 55 bolted to the axle 56 of a vehicle and the other half 57 adapted to be united to the half 55 by suitable clamping bolts. As shown in Fig. 3, the inner face of the clamping ring is curved to correspond with the curvature of the recess in member 54 whereby the materials 52 and 53 are effectively clamped in position against member 54 without producing any sharp bends in the walls either when the chamber is in its open position as shown in the upper portion of Fig. 3, or when it is in its compressed position, as shown in the lower portion of Fig. 3.

In order to attach the unit to the frame 58 the upper end of chamber 50 is reversely curved, as shown, to provide a circular opening to receive a solid member 59. Member 59 at its upper end terminates in a threaded projection 60 to receive a suitable clamping nut 61. For the purpose of clamping the open end of chamber 50 against member 59 there is provided a clamping ring 62 having a sleeve portion 63 adapted to pass loosely over the threaded projection 60, and a flared portion 64, the inner face of which corresponds in curvature to that of the member 52. Suitable screws 65 pass through the ring 62 whereby the member 59 and ring 62 are initially held in proper relation. When the nut 61 is tightened to secure the unit to the frame 58 the member 59 and ring 62 are tightly drawn together, thereby perfectly sealing the end of chamber 50. A similar clamping arrangement is provided for the open end of the lower chamber 51.

The central supporting member 43 is provided with a pasageway 66, the upper end of which is internally threaded to receive a corresponding threaded orifice plate 67 having a relatively small aperture 68 therein for controlling the flow of air between chambers 50 and 51, as described in United States Patent No. 1,649,643. A suitably impregnated washer or gasket 69 is provided beneath the member 67 to assure proper seating and to prevent air leakage.

As a result of the special clamping arrangement shown in this figure the walls of the chambers are capable of expanding and contracting without being subjected to sharp bends at the point at which the walls are attached to the frame and axle. During compression of the chamber the final shape of the wall is determined by the curvature of the clamping means 54 whereby the relative movement between the axle and frame results substantially in a gradual flexure of the wall of the tube with very little compressional strain therein.

Referring to Fig. 4, a still further embodiment is shown comprising upper and lower chambers 70 and 71 similar to chambers 1 and 2 of Fig. 1. In this embodiment, however, the chambers are so designed that in their normal position they are substantially spherical. As shown, each chamber comprises an outer wall 72 of material similar to that used in tire casings having circular openings at opposite ends with the edges of each opening gradually thickened and reenforced by beading 73. An inner tube 74 is provided corresponding to the inner tube 6 of Fig. 1.

As shown in Fig. 4, rubber inserts or protecting pads 75 and 76 are provided for protecting the inner tube from chafing. The insert 75 is secured either by cement or a dovetail joint, as shown, to the screw threaded member 77 which passes through a suitable opening in a bracket 78 attached to a vehicle framework or other body. A two-piece ring 79 is adapted to clamp the beaded ends 73 and provide a rigid support for attachment to the frame. A similar ring 80 is adapted to surround the bead 81 and said ring is adapted to be bolted to a bracket 96 fastened to the axle 82. Passing through the center or ring 80 is a member 83 which is threaded onto a circular member 84 placed within the inner tube 74 to clamp the tube in position in the manner in which valve stems are usually secured to tire inner tubes. Member 84 has a communication aperture 85 corresponding to apertures 3 and 68 of Figs. 1 and 3 respectively. The lower end of the member 83 is adapted to receive a screw threaded projection 86 on a spacer disc 87. Disc 87 also carries on the opposite side a similar projection 88 for cooperating with the lower chamber. One side of chamber 87 has a lateral duct 89 communicating with the central longitudinal duct 90 and closed at its outer end by any well known tire valve arrangement represented by the numeral 91. The lower unit assembly comprising the chamber 71, the ring 92 and the internally threaded member 93 is united to the member 87 similarly to the uniting of the upper unit, by means of the projection 88. The inner tube 94 of the lower unit is clamped against the member 93 by a flanged threaded member 95 having a central opening communicating with the duct 90. The lower end of unit 71 is similar to the upper end of unit 70 and is adapted to be clamped to the frame of the vehicle in a similar manner. The bracket 78 attached to the upper unit is preferably connected to the lower unit as well so that the entire unit may be secured to the vehicle frame by the bracket alone.

Positioned at any convenient place within the interior of the chambers, preferably adjacent to the aperture 85 is a cartridge 97 of hygroscopic material such as potassium hydroxide or other suitable material for preventing the accumulation of moisture within the aperture which might tend to block the communication between the chambers 70 and 71 and which in cold weather might even freeze and permanently block this communication. It will be understood, of course, that a similar cartridge of hygroscopic material may be employed with either of the embodiments shown in Figs. 1 to 3.

While in the foregoing the expression "resilient wall" has been used to describe the automobile tire fabric structure of the chamber walls, it is understood that the invention includes within its scope the use of other wall structures such, for example, as metal bellows of the sylphon type, or the like. Likewise, while the unit disclosed comprises a set of two permanently united chambers, it is clear that each unit may consist of a plurality of sets of chambers. Furthermore, while the chambers are shown in the drawings as superposed, it is understood that the chambers may be arranged adjacent each other in any other desired manner and connection made to the vehicle frame and axle by suitable links to translate the vertical movement of the frame into alternate compressions and expansions of the chambers.

What I claim is:

1. In a vibration damper of the type described, an upper fluid-containing resilient-walled chamber, a lower fluid-containing resilient-walled chamber, each of said chambers having openings at their adjacent faces, a duct extending through each of said openings, means for providing an air-tight seal between each wall and the associate duct, and means for uniting said ducts to each other.

2. In a vibration damper of the type described, an upper fluid-containing chamber having resilient walls, a lower fluid-containing chamber having resilient walls, each of said chambers having communicating openings in their adjacent faces, a screw threaded member passing through each of said openings, each of said members having a central duct, means for providing an air-tight seal between the inner wall of each chamber and the associated member, and means for uniting said members to provide an air-tight communication between the upper and lower chambers.

3. A shock absorber according to claim 2 in which a plate having a relatively small aperture is positioned between the said members.

4. A unit for a shock absorber comprising a plurality of separate resilient-walled chambers, each chamber being substantially in the form of an oblate-spheroid, the minor axes of chambers being in alignment under normal conditions a rigid coupling connecting said chambers, said coupling having a communication duct, and a plate having a restricted opening positioned in said duct.

5. In a device of the character described, a first hollow resilient-walled chamber adapted to contain a fluid under pressure, a second hollow resilient-walled chamber, an opening in the wall of each chamber, said chambers being mounted with the openings in alignment, a threaded flange member passing through each of said openings, each of said members having a longitudinal bore, an aperture plate positioned between the non-flanged ends of said members, and a single sleeve member for rigidly uniting said flange members and for holding said plate in position.

6. In a device of the character described a flexible-walled chamber adapted to contain a fluid under pressure, an open neck for said chamber, a tapered ring inside of said neck, a threaded member extending through said open neck and carrying a flange adapted to engage said tapered ring, a stationary retaining member outside of said chamber and means for securing said threaded member thereto.

7. A device according to claim 6 in which the flange has a raised edge and the tapered ring has an inturned edge cooperating therewith.

8. A shock absorber comprising a resilient-walled chamber having a circular opening therein and means for closing said opening, said means including a circular member having a tapered side and adapted to engage the inside of the wall of said chamber, adjacent said opening, with the smaller end of said member pointing outward, an outer ring member surrounding the wall of said chamber adjacent said opening, and means for drawing said circular member and said ring together to grip said wall.

9. A device in accordance with claim 6 wherein the tapered member comprises a split ring.

10. A resilient-walled chamber having an opening therein, a split tapered ring inside said chamber adjacent to said opening, an outer retaining ring around said chamber adjacent said opening and means for moving said tapered ring towards said retaining ring, said rings being of such relative diameters that the wall of said chamber is clamped between them.

11. A device in accordance with claim 10 wherein the tapered ring has an edge of reduced diameter and said means for moving said tapered ring towards said retaining ring comprises a member having a flange adapted to engage said edge.

12. A shock absorber comprising a flexible casing having a round opening therein, an apertured cover engaging the outside of said casing and serving to close said opening, a member within said casing having a tapered edge adapted to force the wall of said casing adjacent to said opening, against the inside of said cover, said member having a screw threaded shank extending through the aperture in said cover, and a nut thereon for drawing said member toward said cover.

13. A shock absorber in accordance with claim 12 wherein said casing contains an inner tube having a valve stem which passes through a hole extending through said shank.

14. A shock absorber in accordance with claim 12 wherein said casing contains an inner tube having a valve stem which is screw threaded through a hole provided in said shank.

In testimony whereof, I have signed my name to this specification, this 13th day of February 1929.

JOSEPH KAYE WOOD.